US012373730B2

(12) United States Patent
Levy et al.

(10) Patent No.: US 12,373,730 B2
(45) Date of Patent: Jul. 29, 2025

(54) PROGRAMMABLE FEATURE EXTRACTOR

(71) Applicant: Sophos Limited, Abingdon (GB)

(72) Inventors: Joseph H. Levy, Farmington, UT (US); Kenneth D. Ray, Seattle, WA (US); Joshua Daniel Saxe, Wichita, KS (US)

(73) Assignee: Sophos Limited, Abingdon (GB)

( * ) Notice: Subject to any disclaimer, the term of this patent is extended or adjusted under 35 U.S.C. 154(b) by 996 days.

(21) Appl. No.: 17/217,886

(22) Filed: Mar. 30, 2021

(65) Prior Publication Data

US 2022/0318665 A1  Oct. 6, 2022

(51) Int. Cl.
*G06N 20/00* (2019.01)
*G06F 18/2431* (2023.01)
*G06F 21/53* (2013.01)
*G06F 21/56* (2013.01)
*G06V 10/82* (2022.01)
*H04L 9/40* (2022.01)
*H04L 67/02* (2022.01)
(Continued)

(52) U.S. Cl.
CPC .......... *G06N 20/00* (2019.01); *G06F 18/2431* (2023.01); *G06F 21/53* (2013.01); *G06F 21/56* (2013.01); *H04L 63/14* (2013.01); *H04L 67/10* (2013.01)

(58) Field of Classification Search
CPC ..... G06N 20/00; G06F 18/2431; G06F 21/53; G06F 21/56; H04L 63/14; H04L 67/10
See application file for complete search history.

(56) References Cited

U.S. PATENT DOCUMENTS 8,645,362 B1 *   2/2014   Jain .................. G06F 16/951
                                                      707/723
8,709,924 B2    4/2014   Hanawa et al.
9,465,940 B1   10/2016   Wojnowicz et al.
(Continued)

FOREIGN PATENT DOCUMENTS

JP         2012027710 B       7/2014

OTHER PUBLICATIONS

Anuar et al., "Privacy Preserving Features Selection for Data Mining Using Machine Learning Algorithms", Aug. 2020, 8th International Conference on Information Technology and Multimedia, pp. 108-113. 2020.

(Continued)

*Primary Examiner* — Kamran Afshar
*Assistant Examiner* — Steven H Phung
(74) *Attorney, Agent, or Firm* — ALG Intellectual Property, LLC

(57) ABSTRACT

A compute instance stores a programmable feature extractor associated with a machine learning model maintained by a server-based computing system configured to communicate with the compute instance by way of a network. The machine learning model is based on a feature set that includes a plurality of features. The compute instance executes the programmable feature extractor to generate a feature vector corresponding to a data instance accessed by the compute instance, where the feature vector includes a feature value specific to the data instance for each feature included in the feature set. The compute instance transmits the feature vector corresponding to the data instance to the server-based computing system for use as a training input to the machine learning model.

20 Claims, 14 Drawing Sheets

(51) Int. Cl.
    *H04L 67/10*     (2022.01)
    *H04W 12/02*     (2009.01)

(56) References Cited

U.S. PATENT DOCUMENTS

| | | | |
|---|---|---|---|
| 9,489,538 B2 | 11/2016 | Vyas et al. | |
| 9,690,938 B1 | 6/2017 | Saxe et al. | |
| 9,736,264 B2 | 8/2017 | Kraft et al. | |
| 10,193,902 B1* | 1/2019 | Caspi | G06F 21/564 |
| 10,599,844 B2 | 3/2020 | Schmidtler et al. | |
| 10,754,976 B2 | 8/2020 | Aistrope | |
| 10,878,428 B1* | 12/2020 | Comeaux | G06Q 30/0185 |
| 11,409,869 B2 | 8/2022 | Schmidtler et al. | |
| 11,562,007 B1* | 1/2023 | Tang | G06F 16/24573 |
| 11,783,031 B1* | 10/2023 | Han | G06N 3/0442 726/23 |
| 11,809,480 B1* | 11/2023 | Cheng | G06F 16/434 |
| 2007/0240222 A1* | 10/2007 | Tuvell | H04W 12/128 726/24 |
| 2008/0101689 A1* | 5/2008 | Forman | G06F 18/2113 382/159 |
| 2009/0254992 A1 | 10/2009 | Schultz et al. | |
| 2014/0068768 A1 | 3/2014 | Lospinuso et al. | |
| 2014/0090061 A1* | 3/2014 | Avasarala | G06F 21/566 726/24 |
| 2014/0298030 A1 | 10/2014 | Akiyama et al. | |
| 2015/0089647 A1* | 3/2015 | Palumbo | G06F 21/564 726/23 |
| 2015/0199251 A1 | 7/2015 | Buendgen et al. | |
| 2015/0213376 A1 | 7/2015 | Ideses et al. | |
| 2016/0316332 A1 | 10/2016 | Bai et al. | |
| 2017/0286861 A1* | 10/2017 | Kelly | G06N 20/00 |
| 2018/0060591 A1 | 3/2018 | Dobrila et al. | |
| 2018/0219817 A1 | 8/2018 | Zang et al. | |
| 2018/0336369 A1 | 11/2018 | Margalit et al. | |
| 2019/0139237 A1 | 5/2019 | Bresch et al. | |
| 2019/0199736 A1* | 6/2019 | Howard | H04L 63/1425 |
| 2020/0065682 A1* | 2/2020 | Paulina | G16H 20/70 |
| 2020/0082290 A1 | 3/2020 | Pascale et al. | |
| 2020/0118028 A1 | 4/2020 | Harris et al. | |
| 2020/0358599 A1* | 11/2020 | Baracaldo Angel | G06F 21/6227 |
| 2021/0042645 A1* | 2/2021 | Sharma | G06F 16/2379 |
| 2021/0125300 A1 | 4/2021 | Alam et al. | |
| 2021/0150269 A1 | 5/2021 | Choudhury et al. | |
| 2021/0312336 A1* | 10/2021 | Sinn | G06N 3/084 |
| 2021/0374525 A1* | 12/2021 | Bremer | G06F 18/214 |
| 2021/0397427 A1* | 12/2021 | Haswell | H04L 63/083 |
| 2022/0067146 A1* | 3/2022 | Cai | G06F 21/566 |
| 2022/0083911 A1* | 3/2022 | Flanagan | G06Q 30/0282 |
| 2022/0191244 A1* | 6/2022 | Komarek | H04L 63/1466 |

OTHER PUBLICATIONS

Buitinck, Lars & Louppe, Gilles & Blondel, Mathieu & Pedregosa, Fabian & Mueller, Andreas & Grisel, Olivier & Niculae, Vlad & Prettenhofer, Peter & Gramfort, Alexandre & Grobler, Jaques & Layton, Robert & Vanderplas, Jake & Joly, Arnaud & Holt, Brian & Varoquaux, Gael. (2013). "API design for machine learning software: Experiences from the scikit-learn project". API Design for Machine Learning Software: Experiences from the Scikit-learn Project.

Dai, Jianyong & Joohan, Lee. (2009). "Efficient Virus Detection Using Dynamic Instruction Sequences". Journal of Computers. 4. 10.4304/jcp.4.5.405-414.

Devi, Dhruwajita & Nandi, Sukumar. (2012). "Detection of packed malware". 22-26. 10.1145/2490428.2490431.

Elovici, Yuval & Shabtai, Asaf & Moskovitch, Robert & Tahan, Gil & Glezer, Chanan. (2007). "Applying Machine Learning Techniques for Detection of Malicious Code in Network Traffic". 4667. 44-50. 10.1007/978-3-540-74565-5_5.

Henchiri, Olivier & Japkowicz, Nathalie. (2007). "A Feature Selection and Evaluation Scheme for Computer Virus Detection". 891-895. 10.1109/ICDM.2006.4.

Joachims, Thorsten. (1999). "Making large scale SVM learning practical. Advances in Kernel Methods: Upport Vector Machines". 10.17877/DE290R-5098.

Kecman, Vojislav. (2005). "Support Vector Machines—An Introduction". 10.1007/10984697_1.

Kolter, Jeremy & Maloof, Marcus. (2004). "Learning to Detect Malicious Executables in the Wild". Journal of Machine Learning Research. http://doi.acm.org/10.1145/1014052.1014105.

Kolter, Jeremy & Maloof, Marcus. (2006). "Learning to Detect and Classify Malicious Executables in the Wild". Journal of Machine Learning Research. 6. 2721-2744.

Menahem, Eitan & Shabtai, Asaf & Rokach, Lior & Elovici, Yuval. (2009). "Improving malware detection by applying multi-inducer ensemble. Computational Statistics & Data Analysis". 53. 1483-1494. 10.1016/j.csda.2008.10.015.

Monnappa, K A, "Learning Malware Analysis: Explore the Concepts Tools and Techniques to Analyze and Investigate Windows Malware". Birmingham: Packt Publishing; 2018.

Mukkamala, Srinivas & Sung, Andrew & Abraham, Ajith. (2005). "Intrusion detection using an ensemble of intelligent paradigms". Journal of Network and Computer Applications. 28. 167-182. 10.1016/j.jnca.2004.01.003.

Russell SJ Norvig P Chang M-W et al. "Artificial Intelligence: A Modern Approach". Second ed. Upper Saddle River NJ: Pearson; 2003.

Sikorski M. & Honig A. "Practical Malware Analysis: A Hands-On Guide to Dissecting Malicious Software". San Francisco: No Starch Press; 2012.

Souppaya, Murugiah & Scarfone, Karen. (2013). NIST Special Publication 800-83 Revision 1, "Guide to Malware Incident Prevention and Handling for Desktops and Laptops". 10.6028/NIST.SP.800-83r1.

Tahan, Gil & Rokach, Lior & Shahar, Yuval. (2012). "Mal-ID: Automatic Malware Detection Using Common Segment Analysis and Meta-Features". The Journal of Machine Learning Research. 13. 949-979.

Mrus Bulletin (Nov. 1990). Editor: Wilding. ISSN 0956-9979.

Wang, Tzu-Yen & Wu, Chin-Hsiung & Hsieh, Chu-Cheng. (2009). "Detecting Unknown Malicious Executables Using Portable Executable Headers". NCM 2009—5th International Joint Conference on INC, IMS, and IDC. 278-284. 10.1109/NCM.2009.385.

Ye, Yanfang & Chen, Lifei & Wang, Dingding & Li, Tao & Jiang, Qingshan & Zhao, Min. (2009). "SBMDS: An interpretable string based malware detection system using SVM ensemble with bagging". Journal in Computer Virology. 5. 283-293. 10.1007/s11416-008-0108-y.

Ye, Yanfang & Li, Tao & Huang, Kai & Jiang, Qingshan & Chen, Yong. (2010). "Hierarchical associative classifier (HAC) for malware detection from the large and imbalanced gray list". J. Intell. Inf. Syst.. 35. 1-20. 10.1007/s10844-009-0086-7.

* cited by examiner

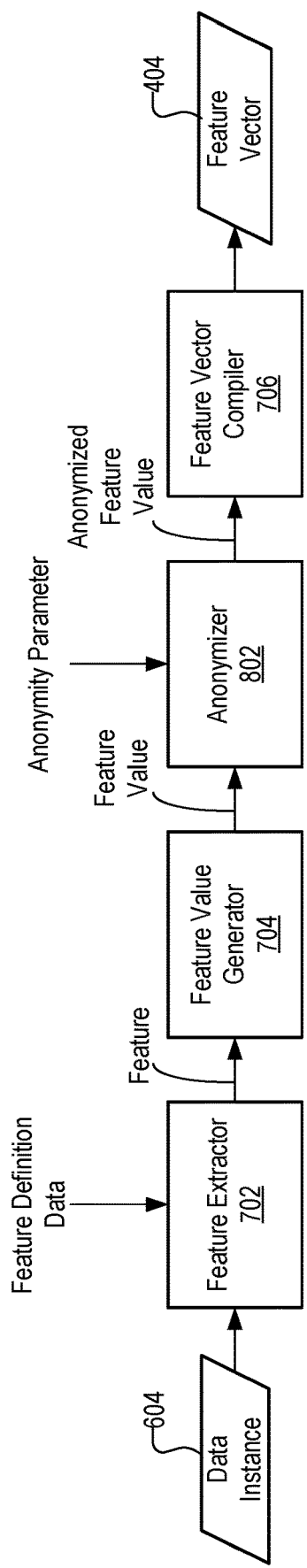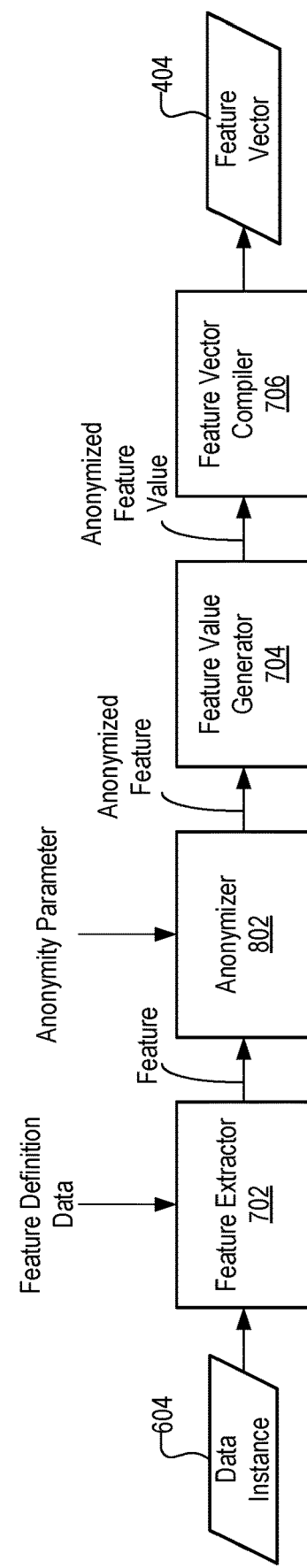

PROGRAMMABLE FEATURE EXTRACTOR

BACKGROUND INFORMATION

Conventional signature-based malware detection systems have difficulty keeping pace with the ever increasing proliferation and complexity of malware attacks. For example, it can be time consuming and resource intensive to identify malicious code associated with a malware attack, generate a malware signature for the malicious code, and update anti-malware software installed on a local compute instance (e.g., a local computing device) with the malware signature so that the anti-malware software can adequately protect the compute instance from the malware attack. Until the anti-malware software is updated with the malware signature, the compute instance may be vulnerable to the malware attack.

Machine learning-based malware detection systems have recently been introduced as an alternative to conventional signature-based malware detection systems. Machine learning-based malware detection systems use machine learning techniques to construct models that recognize malware "features." These models may consist of calculation parameters, classification rule sets, or decision trees that determine the malicious nature of a particular data instance (e.g., a file, a software program, etc.) based, for example, on the determined features. Features of data instances may be extracted into vectors, which may be presented as inputs to the model. Using such a machine learning model, a malware classification system may, in many cases, more effectively and quickly identify data instances as potentially malicious as compared to conventional signature-based malware detection systems.

A machine learning model may be "trained" using a large number (e.g., hundreds, thousands, millions) of previously-classified data instances (e.g., classified as malicious or non-malicious).

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 8A-8B show an anonymizer that may be used to anonymize a feature vector according to principles described herein.

DETAILED DESCRIPTION

Figure 1:
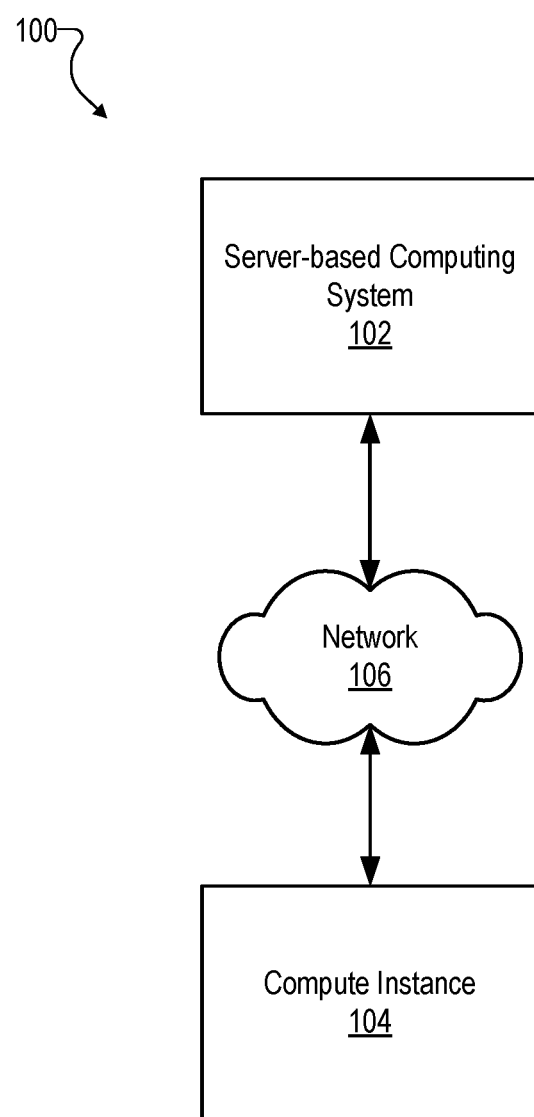
FIG. 1 shows an exemplary configuration in which a server-based computing system is selectively and communicatively coupled to a compute instance according to principles described herein.

Systems and methods for using a programmable feature extractor to generate feature vectors for use with machine learning models are described herein. In some examples, as will be described below, a compute instance (e.g., a computing device used by an end user) may store, within a storage facility of the compute instance, a programmable feature extractor associated with a machine learning model maintained by a server-based computing system configured to communicate with the compute instance by way of a network. The machine learning model may take as input a feature set that includes one or more features. The compute instance may execute the programmable feature extractor to generate a feature vector corresponding to a data instance accessed by the compute instance. As will be described below, the feature vector may include a feature value specific to the data instance for each feature included in the feature set. The compute instance may transmit the feature vector corresponding to the data instance to the server-based computing system. The server-based computing system may apply the feature vector as a training input to construct the machine learning model.

In some examples, the compute instance (using the programmable feature extractor stored on and executed by the compute instance) may anonymize the feature vector to comply with one or more privacy regulations and/or preferences of an end user. For example, the compute instance may extract a feature of a data instance accessed by the compute instance, generate an anonymized feature value for the feature of the data instance, and include the anonymized feature value in a feature vector corresponding to the data instance.

Numerous advantages and benefits are associated with the systems and methods described herein. For example, the systems and methods described herein may provide a server-based computing system with feature vectors associated with data instances, for example, benign data instances. The feature vectors may be used to train a machine learning model that may be used to facilitate improved detection and prevention of malware (e.g., zero-day malware that has not previously been specifically identified as malware, variations of known malware, malware that has been disguised, and so on).

Advantageously, the feature vectors associated with data instances as described herein are generated locally by a compute instance and then transmitted to the server-based computing system. This obviates the need to transmit the data instances themselves to the server-based computing system, which increases efficiency, increases privacy, and reduces bandwidth requirements.

Furthermore, the programmable feature extractor stored and executed by the compute devices described herein to generate the feature vectors is dynamically programmable.

In other words, at any given time (e.g., even as the programmable feature extractor is being executed by a compute instance), the server-based computing system (or any other computing device remote from the compute instance) may update the programmable feature extractor (e.g., by transmitting a programming script to the compute instance) to begin extracting additional or alternative features for representation in feature vectors generated by the programmable feature extractor. This obviates the need to deploy and install patches on each of the compute instances that store and execute the programmable feature extractor, as would be performed during conventional software update procedures. As such, the programmable feature extractor may be updated in essentially real-time on each of the compute instances that execute the programmable feature extractor, thus facilitating immediate action by the compute instances and conserving resources and time associated with conventional software update procedures. Also, this flexibility enables the programmable feature extractor deployed on some systems to test different features than the programmable feature extractor deployed on other systems.

Moreover, by anonymizing the feature vectors described herein, the systems and methods described herein may increase compliance with privacy regulations and increase end user privacy. This, in turn, may incent more end users to allow the feature vectors to be generated and transmitted to the server-based computing system, which may provide the server-based computing system with more data to better train a model. In some examples, as will be described below, the anonymization may be performed in accordance with an anonymization parameter that specifies a degree of anonymity along a sliding scale between full fidelity and full privacy. The anonymization parameter may be set by an end user, thus providing the end user with a specific control over how his or her personal data is accessed and used.

These and other benefits and/or advantages that may be provided by the systems and methods described herein will be made apparent by the following detailed description.

FIG. 1 shows an exemplary configuration 100 in which a server-based computing system 102 is selectively and communicatively coupled to a local compute instance 104 ("compute instance 104") by way of a network 106.

Server-based computing system 102 may be implemented by one or more server-side computing devices configured to communicate with local computing instances (e.g., local compute instance 104) by way of a network (e.g., network 106). For example, server-based computing system 102 may be implemented by one or more servers or other physical computing devices each comprising a processor and memory. Additionally or alternatively, server-based computing system 102 may include or may be implemented by a physical computing device associated with an entity, such as a business or other organization. For example, compute instance 104 may be implemented by a server, a firewall, a gateway, a data center device, a cloud computing instance, etc. Additionally or alternatively, server-based computing system 102 may include or may be implemented by one or more virtual machines that emulate a physical computing device.

Server-based computing system 102 may be configured to perform machine learning-based operations as described herein. For example, server-based computing system 102 may maintain and train a machine learning model for classifying data instances based on a feature set that includes one or more features. These and other operations that may be performed by server-based computing system 102 will be described in more detail below.

In some examples, server-based computing system 102 may be associated with (e.g., managed or maintained by) a security entity that specializes in network and/or computer security and that provides malware detection services to end users and/or enterprises.

Compute instance 104 may be implemented by a physical computing device associated with (e.g., used by) an end user ("user"). For example, compute instance 104 may be implemented by a mobile device (e.g., a mobile phone or tablet computer), a personal computer, a gaming device, an Internet of things ("IoT") device, and/or any other type of physical computing device configured to access data instances (e.g., by way of network 106 and/or from any other source). Additionally or alternatively, compute instance 104 may implemented by a physical computing device associated with an entity, such as a business or other organization. For example, compute instance 104 may be implemented by a server, a firewall, a gateway, a data center device, etc. Additionally or alternatively, compute instance 104 may be implemented by a virtual machine that emulates a physical computing device.

In some examples, compute instance 104 may access data provided by server-based computing system 102 and/or any other computing system (e.g., a content server) by way of network 106. For example, compute instance 104 may be configured to execute an application (e.g., a native application, a mobile application, a web-based application, etc.) and use the application to access (e.g., download, transmit, stream, or otherwise process) one or more data instances by way of network 106 and/or from any other source. Such data instances may include, but are not limited to, a file, metadata associated with a file, an email or other message, network data, streaming data, and/or any other type of data as may serve a particular implementation.

Network 106 may include a provider-specific wired or wireless network (e.g., a cable or satellite carrier network or a mobile telephone network), the Internet, a wide area network, a content delivery network, or any other suitable network, or any combination of networks. Data may flow between server-based computing system 102 and compute instance 104 using any communication technologies, devices, media, and protocols as may serve a particular implementation.

Figure 2:
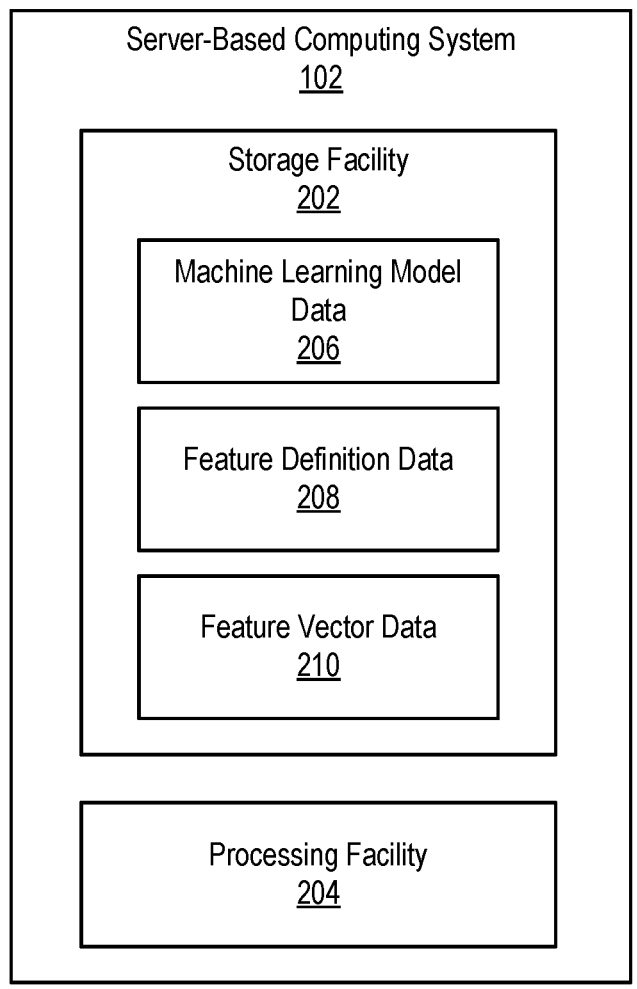
FIG. 2 illustrates exemplary components of a server-based computing system according to principles described herein.

FIG. 2 illustrates exemplary components of server-based computing system 102. As shown, server-based computing system 102 may include, without limitation, a storage facility 202 and a processing facility 204 selectively and communicatively coupled to one another. It will be recognized that although facilities 202 and 204 are shown to be separate facilities in FIG. 2, facilities 202 and 204 may be combined into a single facility or divided into more facilities as may serve a particular implementation. Server-based computing system 102 may be implemented by one or more computing devices (i.e., one or more physical or virtual computing devices). Facilities 202 and 204 will now be described in more detail.

Storage facility 202 may maintain (e.g., store within memory of a computing device that implements server-based computing system 102) various types of data received, generated, managed, used, and/or transmitted by processing facility 204. For example, as shown, storage facility 202 may maintain machine learning model data 206, feature definition data 208, and feature vector data 210. Machine learning model data 206 may include data representative of, used by, or associated with a machine learning model maintained by processing facility 204. Depending on the type of machine learning model, the machine learning model data 206 may include, for example, constants, coefficients, and configurations defining a neural network, rules or parameters associated with a random forest or a decision tree, an association rule, or other model. Feature definition data 208 may include data that defines one or more features included in a feature set used by the machine learning model, for example, to classify data instances. For example, feature definition data 208 may describe particular features, locations of features, manipulations or calculations to be performed on features, combinations of features, or metadata describing features. Feature vector data 210 may be representative of feature vectors applied to the machine learning model (e.g., as training inputs), and may vary based on the features included in a given feature vector. For example, feature vector data 210 may include data based on manipulations or calculations performed on the features. Storage facility 202 may maintain additional or alternative data as may serve a particular implementation.

Processing facility 204 may perform various operations related to the machine learning model. For example, processing facility 204 may be configured to maintain a machine learning model to be used in a classifier for classifying data instances based on a feature set that includes a plurality of features. Processing facility 204 may be further configured to direct a programmable feature extractor stored on and executed by a compute instance (e.g., compute instance 104) to generate a feature vector corresponding to a data instance accessed by the compute instance, receive the feature vector from the compute instance by way of a network (e.g., network 106), and apply the feature vector as a training input to create or improve the machine learning model. These and other operations that may be performed by processing facility 204 will be described in more detail below.

Figure 3:
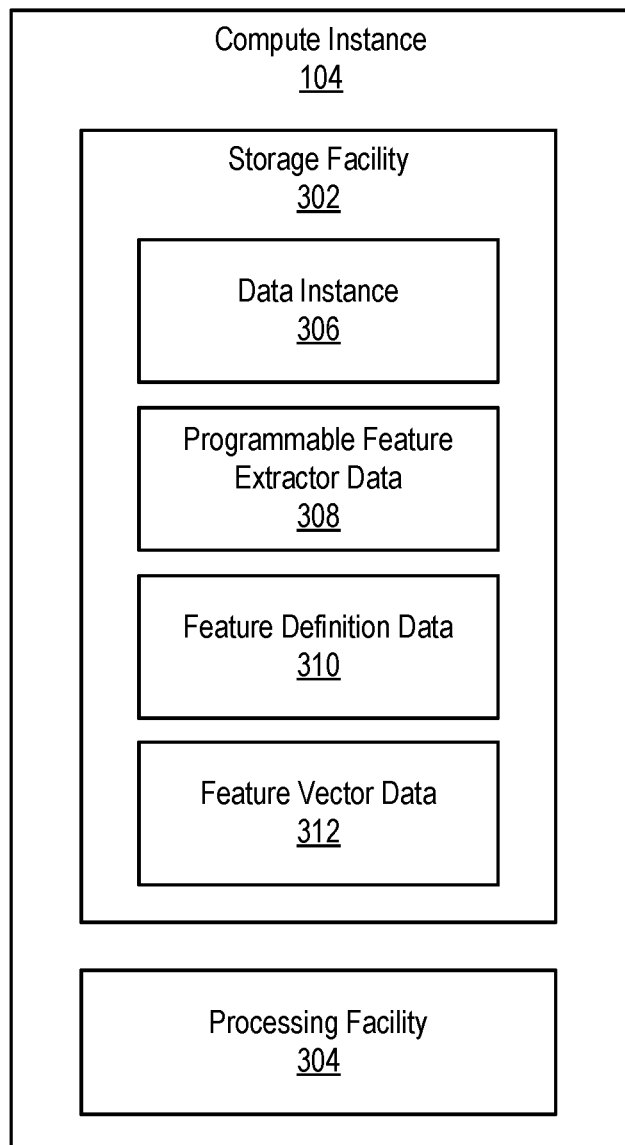
FIG. 3 illustrates exemplary components of a compute instance according to principles described herein.

FIG. 3 illustrates exemplary components of compute instance 104. As shown, compute instance 104 may include, without limitation, a storage facility 302 and a processing facility 304 selectively and communicatively coupled to one another. It will be recognized that although facilities 302 and 304 are shown to be separate facilities in FIG. 3, facilities 302 and 304 may be combined into a single facility or divided into more facilities as may serve a particular implementation. As mentioned, compute instance 104 may be implemented by one or more physical computing devices or virtual machines that emulate a physical computing device.

Storage facility 302 may maintain (e.g., store within memory of compute instance 104) various types of data received, accessed, generated, used, processed, and/or transmitted by processing facility 304. For example, as shown, storage facility 302 may maintain a data instance 306, programmable feature extractor data 308, feature definition data 310, and feature vector data 312. Storage facility 302 may maintain additional or alternative data as may serve a particular implementation.

Data instance 306 may include, for example, any file, portion of a file, or bit sequence maintained by storage facility 302. For example, data instance 306 may include an executable file, a word processing file, an email or other message, metadata associated with a file, a piece of code, etc. Data instance 306 may be persistently stored by storage facility 302 (e.g., in a hard drive or flash memory drive) and/or temporarily stored by storage facility 302 (e.g., in random access memory). In addition to maintaining data instances, compute instance 104 may otherwise access a data instance by remote access, receiving, streaming, or otherwise processing the data instance.

Programmable feature extractor data 308 may include data representative of a programmable feature extractor. For example, programmable feature extractor data 308 may include one or more files that, when executed by compute instance 104, may perform various feature extraction operations, as will be described below. Programmable feature extractor data 308 may further include other data associated with and/or used by the programmable feature extractor. For example, programmable feature extractor data 308 may include data representative of a programming script transmitted to compute instance 104 from server-based computing system 102 to dynamically program the programmable feature extractor executed by compute instance 104.

Feature definition data 310 may be similar to feature definition data 208 and may include data that defines a plurality of features included in a feature set used by a machine learning model to classify data instances. In some examples, feature definition data 310 may be provided (e.g., transmitted to compute instance 104) by server-based computing system 102.

Feature vector data 312 may be representative of a feature vector as generated by compute instance 104 (i.e., by programmable feature extractor being executed by compute instance 104). The feature vector is associated with a data instance (e.g., data instance 306) and may include one or more distinct feature values specific to the data instance for each feature included in a feature set used by a machine learning model, for example, a model maintained by server-based computing system 102.

Processing facility 304 may perform various feature-related operations as may serve a particular implementation. For example, processing facility 304 may execute a programmable feature extractor to generate a feature vector corresponding to a data instance accessed by compute instance 104. While generating the feature vector, processing facility 304 may perform one or more anonymization operations with respect to the feature vector. Processing facility 304 may be further configured to transmit the feature vector to server-based computing system 102 for use as a training input to a machine learning model maintained by server-based computing system 102. For example, processing facility 304 may upload the feature vector to server-based computing system 102 by way of network 106. These and other operations that may be performed by processing facility 304 will be described in more detail below.

Figure 4:
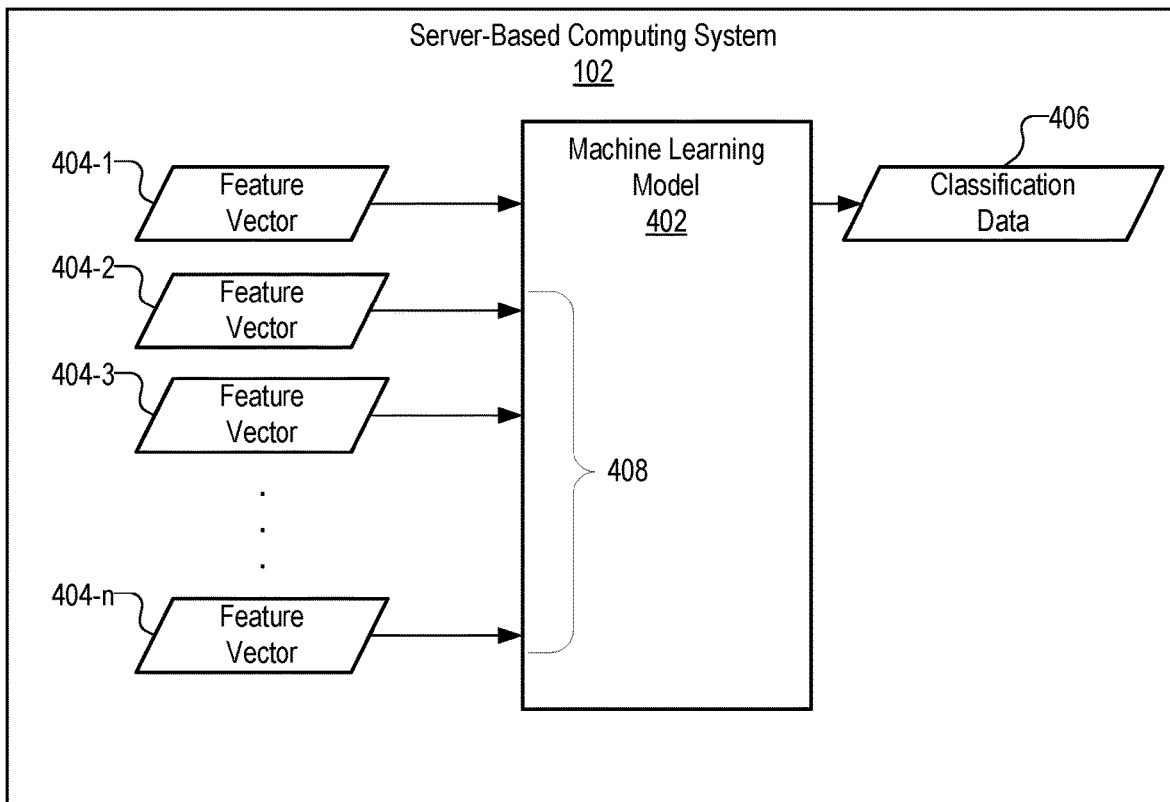
FIG. 4 shows an exemplary machine learning model that may be maintained by a server-based computing system according to principles described herein.

FIG. 4 shows an exemplary machine learning model 402 that may be maintained by server-based computing system 102 (i.e., processing facility 204). Machine learning model 402 may be configured to classify data instances based on a feature set that includes a plurality of features. For example, machine learning model 402 may receive as an input a feature vector 404-1 corresponding to a data instance, analyze the feature vector 404-1, and output classification data 406 for the data instance based on the analysis of feature vector 404-1. Classification data 406 may be representative of a particular classification assigned by machine learning model 402 to the data instance.

In some examples, machine learning model 402 is associated with a malware detection system and configured to classify data instances as malicious or benign, provide a classification of suspiciousness or maliciousness, provide a classification of a type of malware, or other suitable classification. Alternatively, machine learning model 402 may be associated with any other classification or classification system and configured to perform any other suitable type of classification of data instances as may serve a particular implementation. For example, machine learning model 402 may be used to classify data that passes through a firewall as being associated with a particular network site or location. To illustrate, machine learning model 402 may be used to classify data sequences that pass through a firewall as to type of application or originating with or directed to a particular website or type of website. However, for illustrative purposes, it will be assumed herein that machine learning model 402 is associated with a malware detection system and configured to classify data instances as malicious or benign.

Machine learning model 402 may be actively used by a security system, such as a malware detection system. For example, machine learning model 402 may be used in conjunction with a malware detection service (e.g., a malware detection software program) provided by a computer security entity to identify and/or remedy actual malware files and/or attacks. Alternatively, machine learning model 402 may be used in a test or beta mode. For example, machine learning model 402 may be a model that is intended to undergo testing and/or training before being actively used by a malware detection system.

Machine learning model 402 may analyze data in any suitable manner. For example, machine learning model 402 may implement one or more decision tree learning algorithms, association rule learning algorithms, artificial neural network learning algorithms, deep learning algorithms, deep neural networks, and/or any other suitable data analysis techniques as may serve a particular implementation. Exemplary machine learning models and algorithms that may be used in connection with the systems and methods described herein, such as the deep neural networks and other machine learning models described in U.S. Pat. No. 9,690,938.

Server-based computing system 102 may train one or more machine learning models, such as machine learning model 402. This training may be performed prior to and/or concurrently with machine learning model 402 being actively used to classify data instances. To this end, as shown in FIG. 4, a plurality of feature vectors 404 (i.e., feature vectors 404-2 through 404-*n*) corresponding to data instances with associated classifications may be applied as training inputs 408 to machine learning model 402. In many cases, the total number of feature vectors 404 applied to machine learning model 402 as training inputs 408 is relatively large (e.g., tens or hundreds of thousands, millions). By using a large amount of data, machine learning model 402** may be trained to more accurately classify data instances.

Each feature vector 404 applied as training inputs corresponds to a different data instance. For example, some of feature vectors 404 applied as training inputs may correspond to data instances that are known or pre-classified as being malicious, while some of feature vectors 404 applied as training inputs 408 may correspond to data instances that are known or pre-classified as being benign.

Server-based computing system 102 may generate and/or receive feature vectors corresponding to data instances that are classified as being malicious in any suitable manner. For example, server-based computing system 102 may maintain and/or access a database of data instances that are known to be malicious and generate feature vectors for the data instances. Additionally or alternatively, server-based computing system 102 may receive feature vectors corresponding to data instances that are known to be malicious from an external source (e.g., another server-based computing system and/or one or more compute instances associated with end users).

Server-based computing system 102 may receive feature vectors corresponding to data instances that are known or pre-classified as being benign in any suitable manner. For example, as will be described in more detail below, server-based computing system 102 may receive feature vectors from compute instances (e.g., compute instance 104) by way of a network (e.g., network 106). In some examples, machine learning model 402 may assume that these feature vectors correspond to data instances that are benign. In most cases, this assumption is correct. However, machine learning model 402 may occasionally receive, from a compute instance, a feature vector that corresponds to a data instance that is actually malicious. Even though machine learning model 402 may treat this feature vector as corresponding to a data instance that is benign, the training of machine learning model 402 may not be adversely affected due to the large quantity of feature vectors that are used to train machine learning model 402.

As mentioned, machine learning model 402 is configured to classify data instances based on a feature set that includes a plurality of features. To this end, server-based computing system 102 may maintain feature definition data 208, which defines the plurality of features included in the feature set. As will be described below, the feature set may be modified at any time to include additional or alternative features. For example, after machine learning model 402 has been trained for a certain amount of time, an administrator associated with machine learning model 402 may decide that machine learning model 402 may be better trained by analyzing a feature not currently included in the feature set. The administrator may provide user input that causes server-based computing system 102 to update feature definition data 208 to include the new feature in the feature set. As will be described below, server-based computing system 102 may dynamically update programmable feature extractors executed by compute instances to begin extracting the new feature from data sets and including a corresponding feature value in the feature vectors that are transmitted to server-based computing system 102. In like manner, server-based computing system 102 may remove a feature from the feature set.

Figure 5:
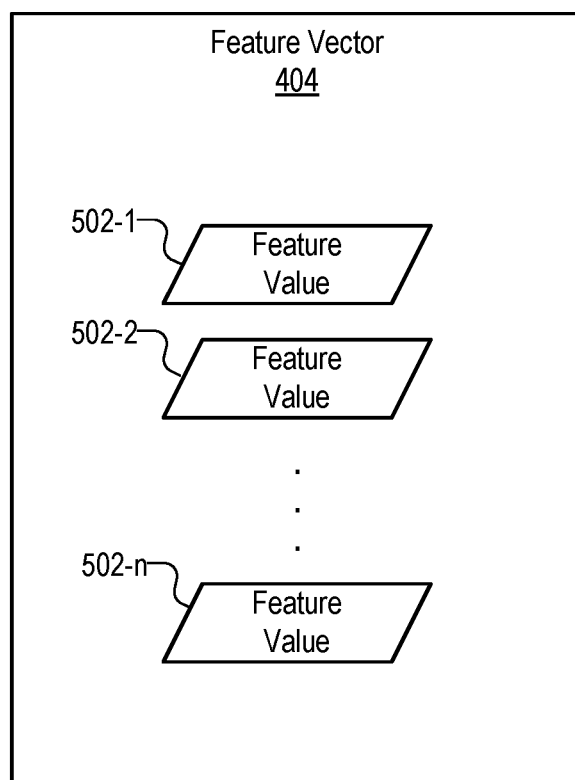
FIG. 5 illustrates an exemplary feature vector that corresponds to a data instance according to principles described herein.

FIG. 5 illustrates an exemplary feature vector 404 that corresponds to a data instance. Feature vector 404 may be of any suitable data structure and/or format. For example, feature vector 404 may be a single or multi-dimensional array of data.

As shown, feature vector 404 includes a plurality of feature values 502 (i.e., 502-1 through 502-*n*). Each feature value 502 corresponds to a particular feature included in the feature set used by machine learning model 402** and represents a value of a feature of the data instance.

A data instance may have many different features for which feature values may be included in feature vector 404. For example, exemplary features of a data instance for which feature values may be included in feature vector 404 include, but are not limited to, an entropy of the data instance, a specific set of byte codes in the data instance, a relative frequency of occurrence of key byte-patterns in the data instance, header information associated with the data instance (e.g., header information for a portable executable file), an author name associated with the data instance, a size of the data instance, a source associated with the data instance, byte values in the data instance, a string length value associated with one or more strings in the data instance, a string hash value of the one or more strings in the data instance, and a compilation date of the data instance. Other suitable features also may be used.

A given feature vector 404 may have a set number of feature values 502 for encoding a particular feature. For example, a relative frequency of key byte-patterns may be encoded into a feature vector 404 that has 256 feature values 502. Other numbers of feature values 502, such as 128, 512, or 1024 feature values, or any suitable number of feature values may be used.

Each feature value 502 may have any suitable format. For example, each feature value 502 may be a numeric value. Each feature value 502 may alternatively be an alphanumeric value, a data string, or of any other suitable format. Exemplary manners in which feature values 502 may be generated will be described below.

Figure 6:
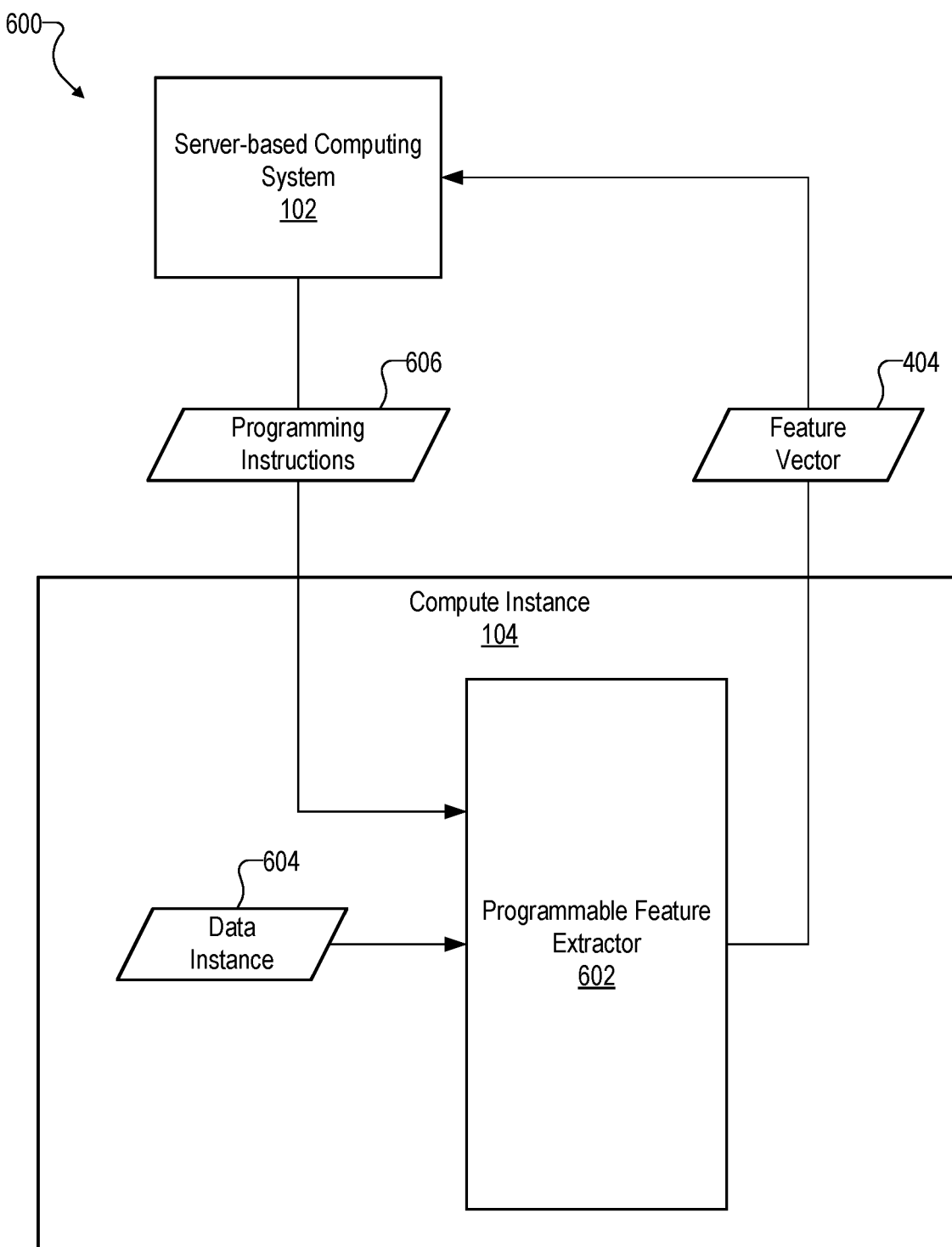
FIG. 6 shows an exemplary configuration in which a compute instance executes a programmable feature extractor to generate and transmit a feature vector corresponding to a data instance according to principles described herein.

FIG. 6 shows an exemplary configuration 600 in which compute instance 104 includes a programmable feature extractor 602 to generate and transmit, to server-based computing system 102, a feature vector 404 corresponding to a data instance 604. Server-based computing system 102 may use feature vector 404 as a training input 408 to machine learning model 402. It will be recognized that when operations are described herein as being performed by compute instance 104, it is meant that any combination of compute instance 104 and programmable feature extractor 602 performs the operations. Likewise, when operations are described herein as being performed by programmable feature extractor 602, it is meant that any combination of compute instance 104 and programmable feature extractor 602 performs the operations.

As shown, programmable feature extractor 602 may reside on (i.e., be stored in memory by) compute instance 104. For example, compute instance 104 may store within memory executable code representative of programmable feature extractor 602.

Programmable feature extractor 602 may be configured to run on compute instance 104 independently from any interaction with server-based computing system 102. Alternatively, programmable feature extractor 602 may be configured to establish a connection with server-based computing system 102 and run in accordance with instructions provided by server-based computing system 102 by way of the connection.

Programmable feature extractor 602 may be configured to run on compute instance 104 independent of any malware detection software installed on compute instance 104. Alternatively, programmable feature extractor 602 may be provided as a component of malware detection software installed on compute instance 104.

Programmable feature extractor 602 may be configured to run in a sandbox environment of compute instance 104. In this manner, programmable feature extractor 602 may be prevented from interfering with other processes or applications running on compute instance 104. Programmable feature extractor 602 may alternatively run in a non-sandbox environment of compute instance 104.

Programmable feature extractor 602 may be provided by server-based computing system 102 to compute instance 104. For example, server-based computing system 102 may transmit data representative of programmable feature extractor 602 to compute instance 104 for installation on compute instance 104. Alternatively, a different system or device unrelated to server-based computing system 102 may provide programmable feature extractor 602 to compute instance 104 for installation on compute instance 104.

Compute instance 104 may execute programmable feature extractor 602 in any suitable manner. For example, programmable feature extractor 602 may run in the background on compute instance 104. In some examples, compute instance 104 may display (e.g., on a display device connected to or a part of compute instance 104) a graphical user interface associated with programmable feature extractor 602. A user may interact with the graphical user interface to provide user input configured to define one or more settings or parameters of programmable feature extractor 602.

Programmable feature extractor 602 may be dynamically programmable by server-based computing system 102 and/or any other computing system remote from compute instance 104. For example, as shown in FIG. 6, server-based computing system 102 may transmit feature extractor programming instructions 606 to compute instance 104 (e.g., by way of network 106). Feature extractor programming instructions 606 may be configured to update programmable feature extractor 602 to extract additional or alternative features from data instances accessed by compute instance 104. For example, server-based computing system 102 may update feature definition data 208 to either define one or more new features as being included in the feature set associated with machine learning model 402 or remove one or more features from being included in the feature set. In response, server-based computing system 102 may transmit programming instructions 606 that include the newly updated feature definition data 208 to compute instance 104. Programming instructions 606 may dynamically update programmable feature extractor 602 to generate feature vectors for data instances accessed by compute instance 104 in accordance with the updated feature definition data 208. Programming instructions 606 may be configured to dynamically update any other aspect of programmable feature extractor 602 as may serve a particular implementation.

Programming instructions 606 may be of any suitable format. For example, programming instructions 606 may be in the form of a programming script (e.g., a LUA or PYTHON script). Upon receiving the programming script, programmable feature extractor 602 may immediately begin operating in accordance with the script. In this manner, programmable feature extractor 602 may be always up-to-date without compute instance 104 having to perform a conventional software update process (e.g., patching). Programming instructions may be in the form of one or more executable modules that may be called by the programmable feature extractor. Such programming instructions may be, for example, in the form of executable code. Such programming instructions may be, for example, in the form of one or more libraries of code implemented in a processor-independent language such as JAVA. Such programming instructions may be, for example, in the form of one or more dynamically loaded or called libraries implemented in native code for the environment of the compute instance 104.

Additionally or alternatively, server-based computing system 102 may dynamically program programmable feature extractor 602 by maintaining a as an ongoing or intermittent communication channel with programmable feature extractor 602 while programmable feature extractor 602 is being executed by compute instance 104. Programming instructions 606 may be transmitted to programmable feature extractor 602 by way of the communication channel at any time during the execution of programmable feature extractor 602 by compute instance 104. Additionally or alternatively, programming instructions 606 may reside on server-based computing system 102. In this configuration, programmable feature extractor 602 may be configured to fetch or otherwise access programming instructions 606 by way of the communication channel.

Although shown as providing one feature vector 404 for a given data instance 604, it should be understood that the programmable feature extractor 602 may support a variety of different features and feature vectors for a given data instance 604. For example, the programmable feature extractor 602 may provide a first feature vector 404 based on a given data instance 604 and a second feature vector (not shown) different from the first feature vector 404, for example, with some overlapping and some of the same feature values, or with different feature values. Additionally or alternatively, the feature vector 404 may include feature vectors derived from multiple features, for example, so that the feature vector 404 may include multiple feature vectors that may be used by different models.

Figure 7:
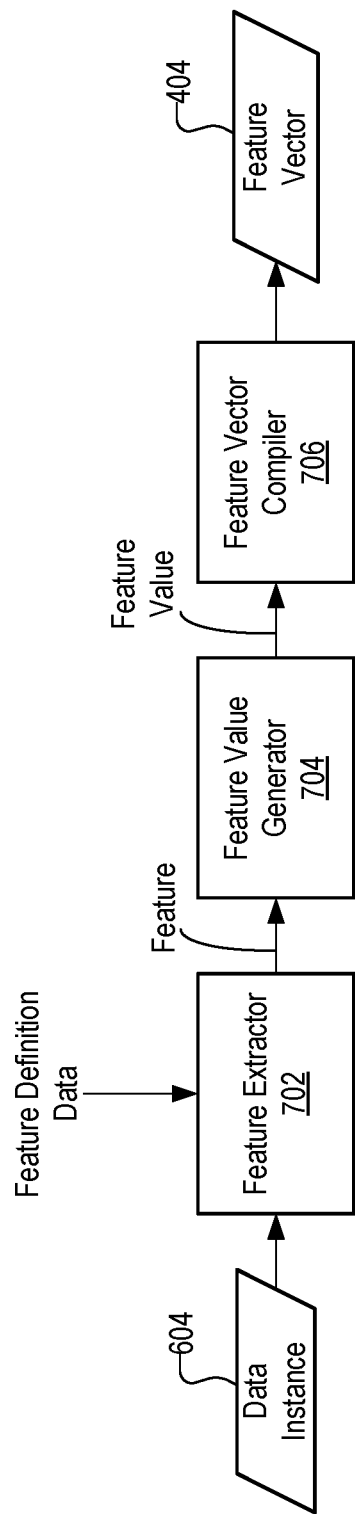
FIG. 7 shows functional modules configured to perform operations to generate a feature vector according to principles described herein.

FIG. 7 shows various functional modules (i.e., modules 702-706) that may be implemented by any suitable combination of compute instance 104 and programmable feature extractor 602 and that may be configured to perform various operations to generate feature vector 404. Additional examples of feature vector generation are described, for example, in the above-referenced U.S. Pat. No. 9,690,938.

As shown, a feature extractor 702 extracts a feature of data instance 604 in accordance with feature definition data (e.g., feature definition data received from server-based computing system 102). The feature definition data may specify one or more features that feature extractor 702 is to extract from data instance 604. For purposes of this example, feature extractor 702 extracts a single feature from data instance 604. However, it will be recognized that feature extractor 702 may extract any number of features from data instance 604 as specified by the feature definition data.

Feature extractor 702 may extract a feature of data instance 604 in any suitable manner. For example, feature extractor 702 may identify data within data instance 604 that is representative of the feature and copy the data to a location in memory of compute instance 104. For example, if feature is an author name associated with data instance 604, feature extractor 702 may identify data within data instance 604 that specifies the author name and copy this data to a location in memory of compute instance 104. In some examples, data instance 604 may be compressed or otherwise processed before being analyzed by feature extractor 702.

A feature value generator 704 generates a feature value for the feature extracted by feature extractor 702. This may be performed in any suitable manner. For example, feature value generator 704 may compute a hash value for the feature (i.e., a numeric value that uniquely identifies the feature). As mentioned above, the feature value generated by feature value generator 704 may alternatively be an alphanumeric value, a data string, or of any other suitable format.

A feature vector compiler 706 generate feature vector 404 by receiving the feature value as an input and processing the feature value together with any other feature value generated by feature value generator 704 for data instance 604. For example, feature vector compiler 706 may apply one or more compiler operations to the feature value to include the feature value in a suitable data structure for feature vector 404. In some examples, feature vector compiler 706 may concurrently generate multiple feature vectors corresponding to multiple data instances accessed by compute instance 104.

Once feature vector 404 has been generated, compute instance 104 may transmit feature vector 404 to server-based computing system 102. In some examples, compute instance 104 transmits feature vector 404 to server-based computing system 102 immediately in response to feature vector 404 being generated. Alternatively, compute instance 104 may store feature vector 404 in memory for a period of time before transmitting feature vector 404 to server-based computing system 102. For example, compute instance 104 may wait to transmit feature vector 404 to server-based computing system 102 until other feature vectors are generated, until CPU and/or network usage by compute instance 104 is below a certain threshold, or until a predetermined time specified by a transmission schedule. In these cases, multiple feature vectors may be concurrently transmitted by compute instance 104 to server-based computing system 102.

Programmable feature extractor 602 (FIG. 6) may be configured to anonymize feature vector 404 to comply with one or more privacy regulations and/or preferences of a user. As will be described below, programmable feature extractor 602 may be programmed to generate feature vectors that have customizable degrees of anonymity (e.g., anywhere between full fidelity (minimal or no privacy) and full privacy).

In some examples, programmable feature extractor 602 may anonymize feature vector 404 by applying one or more privacy operations to feature values generated by feature value generator 704 before feature vector 404 is generated.

For example, FIG. 8A shows that an anonymizer 802 may be included functionally, for example, in between feature value generator 704 and feature vector compiler 706. Anonymizer 802 may be implemented by any suitable combination of compute instance 104 and programmable feature extractor 602, or other suitable hardware or software implementation.

In FIG. 8A, anonymizer 802 outputs an anonymized feature value by performing a privacy operation on the feature value output by feature value generator 704. Feature vector compiler 706 receives the anonymized feature value as an input (instead of the non-anonymized feature value output by feature value generator 704 as described in connection with FIG. 7) and includes the anonymized feature value in feature vector 404.

FIG. 8B shows an alternative use of anonymizer 802 in which anonymizer 802 is used to perform a privacy operation on the feature output by feature extractor 702 (instead of on the feature value corresponding to the feature). In this configuration, anonymizer 802 outputs an anonymized feature, which is then processed by feature value generator 704 to generate an anonymized feature value for the feature. In some alternative examples, anonymizer 802 may perform one or more privacy operations on both features and feature values.

Anonymizer 802 may perform a privacy operation on a feature and/or a feature value in any suitable manner. For example, anonymizer 802 may add noise to the feature and/or feature value in accordance with a differential privacy heuristic. To illustrate, anonymizer 802 may add noise (e.g., random data) to the feature from a Laplace or Gaussian distribution. This may cause feature value generator 704 to output a feature value that is not quite exactly representative of the feature, or not strictly deterministic, but that is still sufficient to train a machine learning model 402.

As another example, anonymizer 802 may perform a privacy operation by compressing the feature and/or the feature value. The compression may be performed in accordance with a feature hashing heuristic, an autoencoding heuristic, and/or any other compression heuristic as may serve a particular implementation.

As shown in FIGS. 8A-8B, anonymizer 802 may perform a privacy operation on a feature and/or a feature value in accordance with an anonymity parameter. The anonymity parameter specifies a degree of anonymity that the feature value is to have once the privacy operation is performed on the feature and/or feature value. Hence, compute instance 104 may maintain data representative of the anonymity parameter and use it to determine the amount of noise and/or compression that is applied to a feature and/or a feature vector.

The degree of anonymity specified by the anonymity parameter may be any degree along a sliding scale having two extremes—full fidelity and full privacy. A feature value that has "full fidelity" is one that has not been anonymized or very minimally anonymized and that may therefore be a practically perfect representation of its corresponding feature. In contrast, a feature value that has "full privacy" is one that has been heavily manipulated (e.g., with noise and/or compression) such that it has fully irreversible anonymity.

It will be recognized there is a tradeoff between fidelity (i.e., efficacy in representing a feature) and privacy and that different degrees of anonymity may be appropriate and/or acceptable for machine learning model 402 depending on a number of different factors (e.g., the type of the data instance, the purpose for which machine learning model 402 needs to analyze a feature vector for the data instance, etc.). Moreover, certain entities (e.g., government agencies) may mandate a particular degree of anonymization. Hence, in some examples, server-based computing system 102 may specify the anonymization parameter based on any of these factors and transmit data representative of the anonymization parameter to compute instance 104. Compute instance 104 may receive the data representative of the anonymity parameter from server-based computing system 102 and use it to perform the privacy operations on features and/or feature values.

Figure 9:
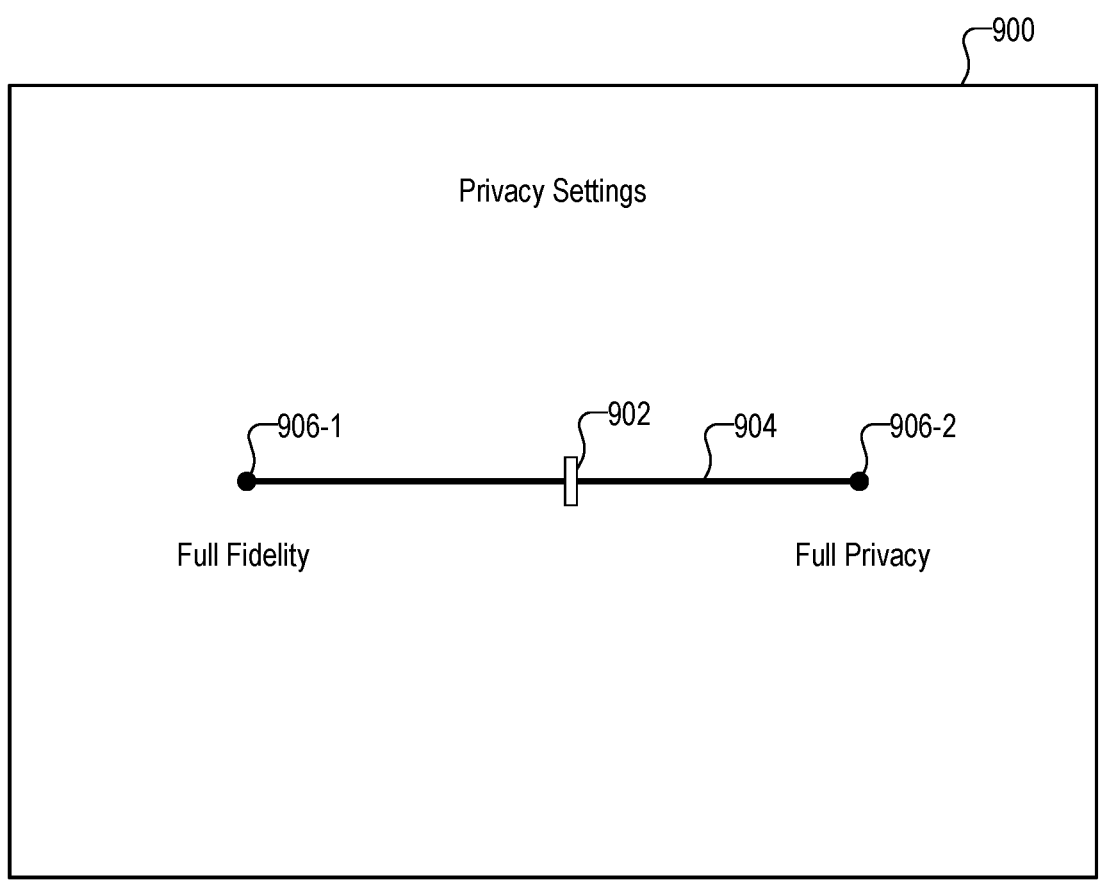
FIG. 9 shows an exemplary graphical user interface according to principles described herein.

Additionally or alternatively, a user may set and/or adjust the anonymization parameter based on one or more preferences of the user. For example, FIG. 9 shows an exemplary graphical user interface 900 that may be associated with programmable feature extractor 602 and presented by compute instance 104 (e.g., on a display device connected to or a part of compute instance 104). As shown, a user may interact with graphical user interface 900 to adjust a degree of anonymity used by programmable feature extractor 602 to generate feature vectors. In particular, the user may adjust a position of a slider 902 along a sliding scale 904 between a first end 906-1 (full fidelity) and as second end 906-2 (full privacy). The position of slider 902 may be translated by compute instance 104 into a corresponding degree of anonymization that programmable feature extractor 602 uses to generate feature vectors. The user may alternatively specify the anonymization parameter in any suitable manner.

As an example, an administrator at an entity (e.g., a company) may interact with graphical user interface 900 to specify a degree of anonymization that programmable feature extractor 602 uses to generate feature vectors for data instances accessed by compute instances owned or otherwise managed by the organization. An administrator can optimize the training of a machine learning model specifically designed to be used to classify data instances accessed by the entity's compute instances against preserving anonymity, and, for example, the administrator may position slider 902 closer to first end 906-1 (full fidelity) than to second end 906-2 (full privacy).

Additionally or alternatively, compute instance 104 may automatically determine the anonymity parameter based on an attribute of a particular data instance for which a feature vector is to be generated. For example, personal files (e.g., word processing files, emails, etc.) associated with a user may be assigned an anonymity parameter that specifies a relatively high degree of anonymity, while non-personal files (e.g., media files, executable files, etc.) may be assigned an anonymity parameter that specifies a relatively low degree of anonymity. In some implementations, an administrator may select different privacy settings based on attributes of data instances. For example, an administrator may assign a higher anonymity parameter to office document files generated by a user or generated within a company than to software application programs or files downloaded from the internet.

In some examples, compute instance 104 and/or server-based computing system 102 may be required to receive consent by a user of compute instance 104 before programmable feature extractor 602 performs some or any of the feature vector generation operations described herein. For example, compute instance 104 may receive consent from the user by way of a graphical user interface. Compute instance 104 may store the data representative of the consent and/or transmit the data representative of the consent to server-based computing system 102 and, in response, begin generating and transmitting feature vectors. In some implementations, consent may be required based on attributes of data instances. For example, consent may be required for office documents or other documents created by a user, but not required for software application programs.

Figure 10:
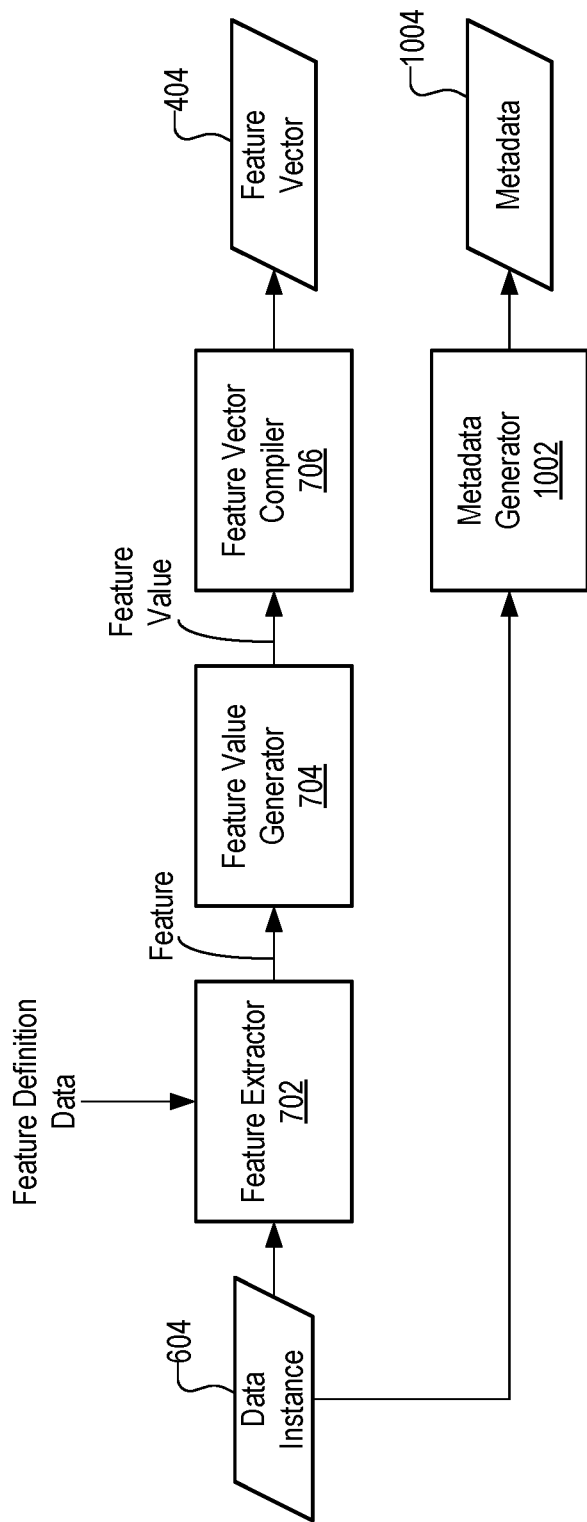
FIG. 10 illustrates an exemplary configuration in which a metadata generator generates metadata associated with a feature vector according to principles described herein.

Programmable feature extractor 602 and/or compute instance 104 may be further configured to generate additional data associated with feature vector 404. For example, FIG. 10 illustrates an exemplary configuration in which a metadata generator 1002 generates metadata 1004 associated with feature vector 404. Metadata generator 1002 may be implemented by any suitable combination of compute instance 104 and programmable feature extractor 602. Metadata generator 1002 may analyze data instance 604 and generate metadata that identifies an attribute associated with data instance 604. The attribute may include a type associated with data instance 604 (e.g., WORD files, image files, emails, etc.), an identity of compute instance 104 (e.g., an IP address, a computer name, etc.), an identity of a user of compute instance 104 (e.g., a user name), an identity of a source of data instance 604 (e.g., a URL of a content provider that provides data instance 604, etc.), a geolocation of compute instance 104, and/or any other characteristic associated with data instance 604.

Compute instance 104 may transmit metadata to server-based computing system 102 together with feature vector 404. In some examples, compute instance 104 includes the metadata in feature vector 404. Alternatively, compute instance 104 may transmit the metadata in a data structure separate from feature vector 404. Server-based computing system 102 may use the metadata together with feature vector 404 to train machine learning model 402.

In some examples, one or more of the operations described in connection with FIGS. 7-10 are performed by compute instance 104 (i.e., by programmable feature extractor 602 independently from (e.g., without being specifically instructed by) server-based computing system 102. Alternatively, one or more of the operations described in connection with FIGS. 7-10 are performed by compute instance 104 at the direction of server-based computing system 102. For example, server-based computing system 102 may transmit instructions to compute instance 104 for programmable feature extractor 602 to perform one or more of the operations described in connection with FIGS. 7-10.

When machine learning model 402 has been adequately trained, server-based computing system 102 may direct a malware detection program stored on and executed by compute instance 104 to use machine learning model 402 to classify data instances accessed by compute instance 104, for example, as being either malicious or benign. For example, the malware detection program may generate a feature vector corresponding to a data instance that is accessed by compute instance 104 and transmit the feature vector to server-based computing system 102. Server-based computing system 102 may apply the feature vector to machine learning model 402, which may classify the data instance as either malicious or benign. Server-based computing system 102 may transmit data representative of the classification to the malware detection program, which may take appropriate action corresponding to the classification.

Figure 11:
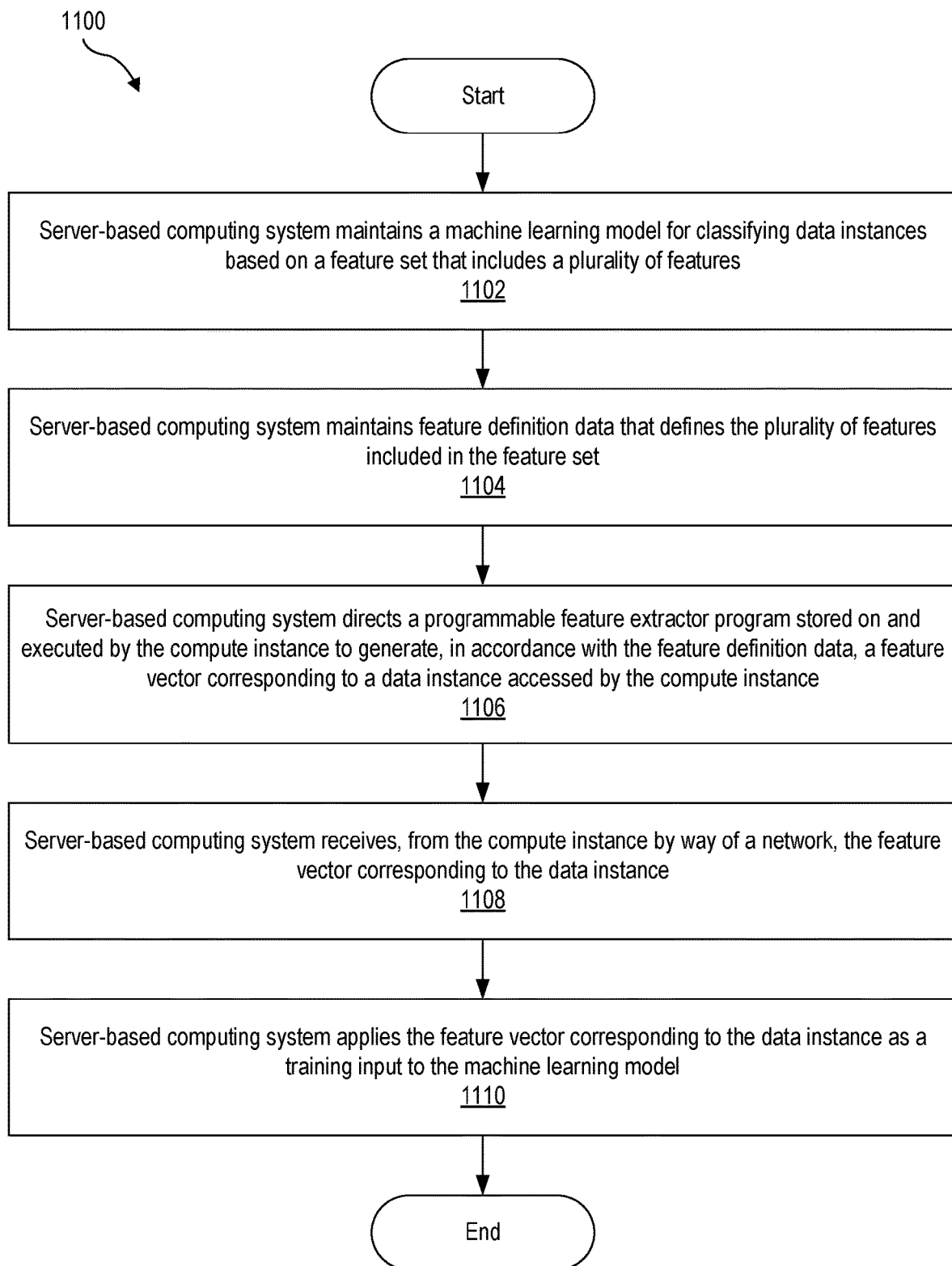
FIGS. 11-13 illustrate various methods according to principles described herein.

FIG. 11 illustrates an exemplary method 1100 that may be performed by a server-side computing system (e.g., server-based computing system 102). While FIG. 11 illustrates exemplary operations according to one embodiment, other embodiments may omit, add to, reorder, and/or modify any of the operations shown in FIG. 11.

In operation 1102, a server-based computing system maintains a machine learning model for classifying data instances based on a feature set that includes a plurality of features. Operation 1102 may be performed in any of the ways described herein.

In operation 1104, the server-based computing system maintains feature definition data that defines the plurality of features included in the feature set. Operation 1104 may be performed in any of the ways described herein.

In operation 1106, the server-based computing system directs a programmable feature extractor program stored on and executed by the compute instance to generate, in accordance with the feature definition data, a feature vector corresponding to a data instance accessed by the compute instance. Operation 1106 may be performed in any of the ways described herein.

In operation 1108, the server-based computing system receives, from the compute instance by way of a network, the feature vector corresponding to the data instance. Operation 1108 may be performed in any of the ways described herein.

In operation 1110, the server-based computing system applies the feature vector corresponding to the data instance as a training input to the machine learning model. Operation 1110 may be performed in any of the ways described herein.

Figure 12:
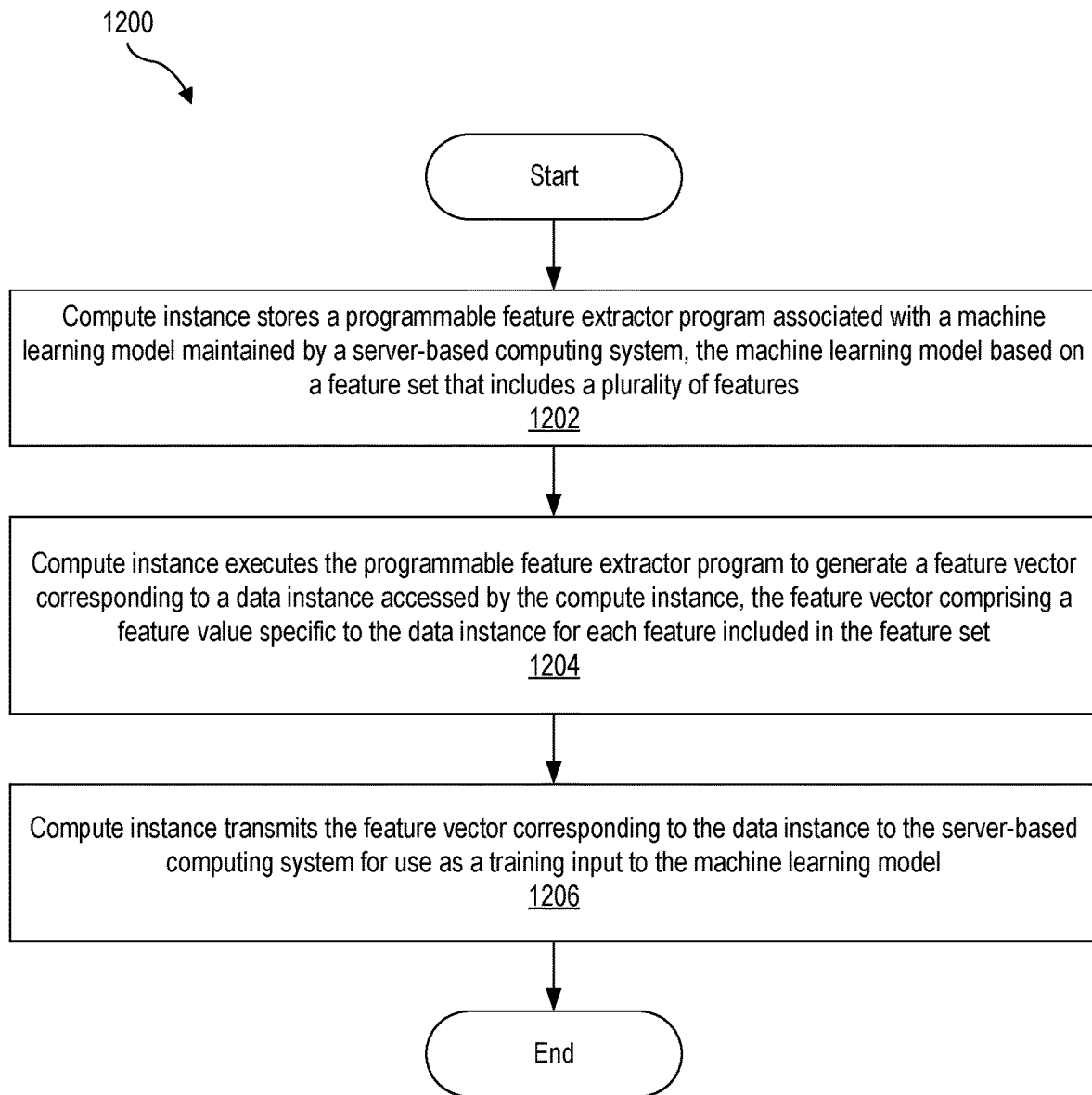

FIG. 12 illustrates an exemplary method 1200 that may be performed by a compute instance (e.g., compute instance 104). While FIG. 12 illustrates exemplary operations according to one embodiment, other embodiments may omit, add to, reorder, and/or modify any of the operations shown in FIG. 12.

In operation 1202, a compute instance stores a programmable feature extractor program associated with a machine learning model maintained by a server-based computing system. The machine learning model is based on a feature set that includes a plurality of features. Operation 1202 may be performed in any of the ways described herein.

In operation 1204, the compute instance executes the programmable feature extractor program to generate a feature vector corresponding to a data instance accessed by the compute instance. The feature vector includes a feature value specific to the data instance for each feature included in the feature set. Operation 1204 may be performed in any of the ways described herein.

In operation 1206, the compute instance transmits the feature vector corresponding to the data instance to the server-based computing system for use as a training input to the machine learning model. Operation 1206 may be performed in any of the ways described herein.

Figure 13:
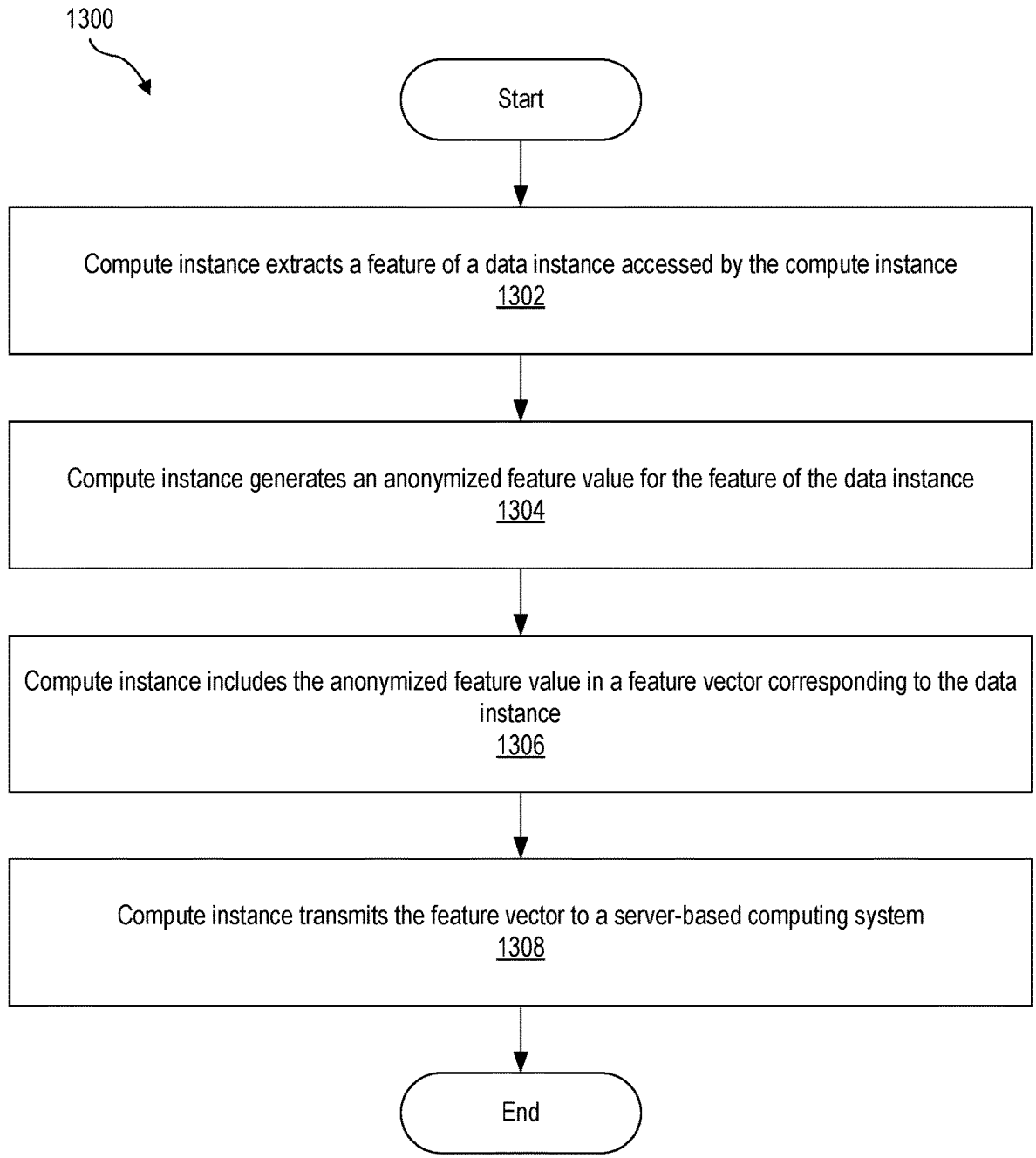

FIG. 13 illustrates another exemplary method 1300 that may be performed by a compute instance (e.g., compute instance 104). While FIG. 13 illustrates exemplary operations according to one embodiment, other embodiments may omit, add to, reorder, and/or modify any of the operations shown in FIG. 13.

In operation 1302, a compute instance extracts a feature of a data instance accessed by the compute instance. Operation 1302 may be performed in any of the ways described herein.

In operation 1304, the compute instance generates an anonymized feature value for the feature of the data instance. Operation 1304 may be performed in any of the ways described herein.

In operation 1306, the compute instance includes the anonymized feature value in a feature vector corresponding to the data instance. Operation 1306 may be performed in any of the ways described herein.

In operation 1308, the compute instance transmits the feature vector to a server-based computing system. Operation 1308 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 14:
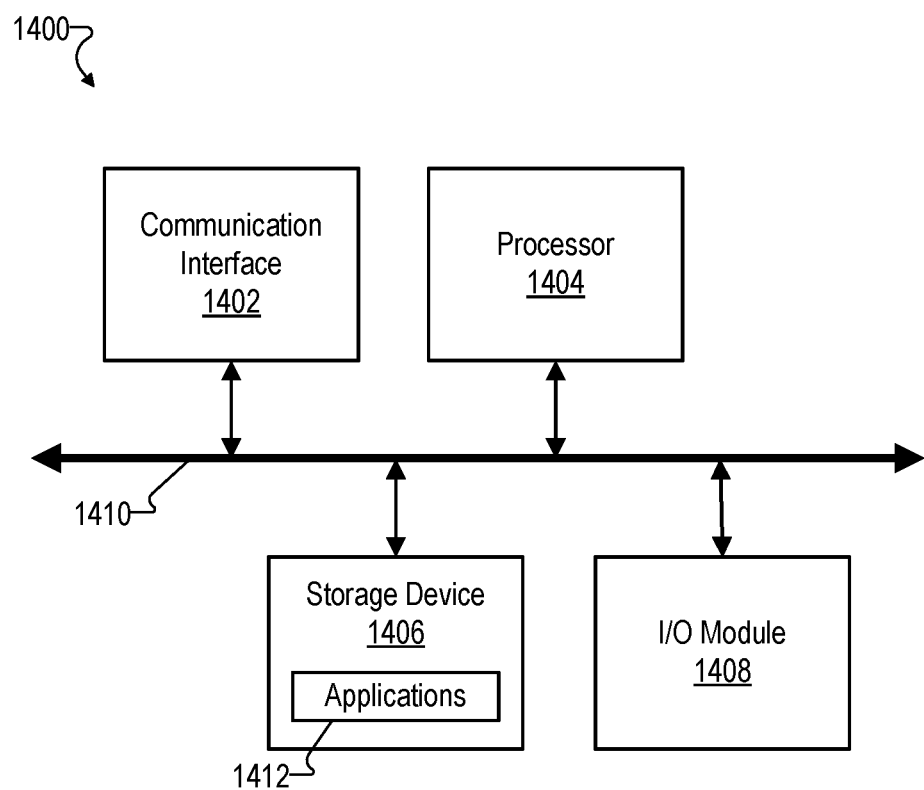
FIG. 14 illustrates an exemplary computing device according to principles described herein.

FIG. 14 illustrates an exemplary computing device 1400 that may be specifically configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1406. For example, data representative of one or more executable applications 1412 configured to direct processor 1404 to perform any of the operations described herein may be stored within storage device 1406. In some examples, data may be arranged in one or more databases residing within storage device 1406.

I/O module 1408 may include one or more I/O modules configured to receive user input and provide user output. One or more I/O modules may be used to receive input for a single virtual experience. I/O module 1408 may include any hardware, firmware, software, or combination thereof supportive of input and output capabilities. For example, I/O module 1408 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with processing facility 204 of server-based computing system 102 and/or processing facility 304 of compute instance 104. Likewise, storage facilities 202 and 302 may be implemented by or within storage device 1406.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

What is claimed is:

1. A system comprising:
  a server-based computing system configured to communicate with a compute instance by way of a network, the server-based computing system comprising at least one physical computing device configured to
    maintain a machine learning model for classifying data instances based on a feature set that includes a plurality of features, the machine learning model being usable to detect malware;

maintain feature definition data that defines the plurality of features included in the feature set;

transmit, to the compute instance by way of the network, programming instructions that include the feature definition data and that direct a programmable feature extractor stored on and executed by the compute instance to generate, in accordance with the feature definition data, a feature vector corresponding to a data instance accessed by the compute instance, the feature vector comprising a feature value specific to the data instance for each of the plurality of features included in the feature set, wherein the plurality of features comprise a specific set of byte codes in the data instance, a relative frequency of occurrence of key byte-patterns in the data instance, and a string hash value of one or more strings in the data instance;

receive, from the compute instance by way of the network, the feature vector corresponding to the data instance;

apply the feature vector received from the compute instance to the machine learning model;

classify, based on the applying the feature vector to the machine learning model, the data instance as malicious; and cause, based on the classifying the data instance as malicious, a malware detection program to take an action associated with protecting the compute instance from a malware attack.

2. The system of claim 1, wherein the at least one physical computing device is further configured to:
update the feature definition data to either define a new feature as being included in the feature set or remove a feature from being included in the feature set; and
dynamically update the programmable feature extractor stored on and executed by the compute instance to generate additional feature vectors for additional data instances accessed by the compute instance in accordance with the updated feature definition data.

3. The system of claim 1, wherein the at least one physical computing device is further configured to transmit, prior to directing the programmable feature extractor to generate the feature vector, data representative of the programmable feature extractor to the compute instance for installation on the compute instance.

4. The system of claim 1, wherein:
the at least one physical computing device is further configured to receive, from the compute instance, data representative of consent by a user of the compute instance for the programmable feature extractor to generate and transmit the feature vector; and
the at least one physical computing device is configured to direct the programmable feature extractor to generate the feature vector in response to the receipt of the consent.

5. The system of claim 1, wherein the at least one physical computing device is further configured to transmit, by way of the network, the feature definition data to the compute instance for use by the programmable feature extractor in generating the feature vector.

6. The system of claim 1, wherein the at least one physical computing device is configured to direct the programmable feature extractor to generate the feature vector by:
extracting a feature of the data instance, the feature included in the feature set;
generating an anonymized feature value for the feature of the data instance; and
including the anonymized feature value in the feature vector.

7. The system of claim 6, wherein the at least one physical computing device is configured to direct the programmable feature extractor to generate the anonymized feature value by performing a privacy operation on the feature value.

8. The system of claim 7, wherein the performing of the privacy operation on the feature value comprises adding noise to the feature value in accordance with a differential privacy heuristic.

9. The system of claim 7, wherein the performing of the privacy operation on the feature value comprises compressing the feature value.

10. The system of claim 1, wherein the at least one physical computing device is further configured to:
direct the programmable feature extractor to generate metadata associated with the feature vector corresponding to the data instance, the metadata identifying an attribute associated with the data instance; and
receive, from the compute instance by way of the network, the metadata together with the feature vector.

11. The system of claim 10, wherein the attribute associated with the data instance identified by the metadata comprises at least one of a type associated with the data instance, an identity of the compute instance, an identity of a user of the compute instance, an identity of a source of the data instance, or a geolocation of the compute instance.

12. The system of claim 10, wherein the programmable feature extractor includes the metadata in the feature vector.

13. The system of claim 10, wherein the programmable feature extractor includes the metadata in a data structure separate from the feature vector.

14. The system of claim 1, wherein the data instance comprises at least one of a file accessed by the compute instance, metadata associated with the file accessed by the compute instance, a portion of the file accessed by the compute instance, an email accessed by the compute instance, network data accessed by the compute instance, or streaming data accessed by the compute instance.

15. The system of claim 1, wherein the at least one physical computing device is further configured to:
direct the programmable feature extractor to generate an additional feature vector corresponding to an additional data instance accessed by the compute instance concurrently with the generation of the feature vector; and
concurrently receive, from the compute instance by way of the network, the feature vector and the additional feature vector.

16. The system of claim 1, wherein the programmable feature extractor is configured to run in a sandbox environment of the compute instance.

17. The system of claim 1, wherein the at least one physical computing device is further configured to train the machine learning model, the training comprising:
applying, as a first plurality of training inputs to the machine learning model, a first plurality of feature vectors corresponding to data instances that are pre-classified as being malicious, and
applying, as a second plurality of training inputs to the machine learning model, a second plurality of feature vectors corresponding to data instances that are pre-classified as being benign, the second plurality of feature vectors including the feature vector corresponding to the data instance.

18. The system of claim 1, wherein the plurality of features further comprises a size of the data instance.

19. The system of claim 1, wherein the plurality of features further comprises an author name associated with the data instance, a source associated with the data instance, byte values in the data instance, and a string length value associated with one or more strings in the data instance.

20. The system of claim 1, wherein the plurality of features further comprises an entropy of the data instance.

\* \* \* \* \*